United States Patent [19]

Schumacher

[11] 4,390,506

[45] Jun. 28, 1983

[54] APPARATUS FOR TROUBLE-FREE AND CONTINUOUS CHARGING OF EXTRACTORS WITH EXTRACTION FEEDSTOCK TO BE TREATED AND WITH EXTRACTANT OR SOLVENT

[76] Inventor: Heinz O. Schumacher, Höperfeld 26, D-2050 Hamburg 80, Fed. Rep. of Germany

[21] Appl. No.: 313,956

[22] Filed: Oct. 22, 1981

[51] Int. Cl.³ .............................................. B01D 11/02
[52] U.S. Cl. .................................... 422/273; 422/281
[58] Field of Search ............... 422/261, 256, 273, 281, 422/310; 426/430; 260/412.4; 99/510; 366/88, 323; 198/676, 625, 661, 662, 663

[56] References Cited

U.S. PATENT DOCUMENTS

| 2,074,988 | 3/1937 | O'Brien ............................ 422/273 |
| 2,404,884 | 7/1946 | Pieper ............................... 198/661 |
| 2,954,280 | 9/1960 | Brown ............................... 422/281 |
| 3,630,754 | 12/1971 | Wayne ............................. 426/230 |
| 3,796,508 | 3/1974 | Rowley ............................. 366/323 |
| 3,841,908 | 10/1974 | Giersing ........................... 198/661 |
| 3,896,923 | 7/1975 | Griffith ............................ 198/661 |
| 4,122,104 | 10/1978 | Witte ................................ 426/230 |
| 4,311,561 | 1/1982 | Hastings .......................... 422/273 |

Primary Examiner—Bernard Nozick
Attorney, Agent, or Firm—Bachman and LaPointe

[57] ABSTRACT

The apparatus serves particularly for the continuous charging of extractors for oil-containing vegetable raw materials, wherein highly flammable, low-boiling solvents, such as benzene, hexane, heptane etc. are used as extractants or solvents for the glyceride constituents to be extracted. The apparatus, which is provided between the preparation (comminution) of the raw material and the extraction plant proper, comprises an equalizing vessel having a mixing zone and a double screw disposed at an inclination with respect to the horizontal wherein the spacing of the screw turns, in the area of the vessel, increases continuously in the direction towards the discharge outlet.

The inclination of the screw is such that the space defined by the base of the screw and an imaginary line is constantly filled.

Equalizing vessel, mixing zone and screw are interconnected to form a tightly sealed unit.

10 Claims, 3 Drawing Figures

APPARATUS FOR TROUBLE-FREE AND CONTINUOUS CHARGING OF EXTRACTORS WITH EXTRACTION FEEDSTOCK TO BE TREATED AND WITH EXTRACTANT OR SOLVENT

BACKGROUND OF THE INVENTION

The present invention relates to apparatus for charging or filling extractors of the type in which particularly oil-containing vegetable raw materials, such as oil seed and oil fruit, are treated with an organic solvent or extractant in a continuous process wherein the glyceride components (oils and fats) are transformed into the extracted liquid phase.

Practically the only substances used in the art as extractants or solvents for oil seeds, especially where edible oils and edible fats are to be produced, are benzene, hexane, heptane, octane or blends thereof having boiling ranges from 60° to 100° C.

Apparatus and equipment for continuously operating extraction processes are largely known and reference is made to the pertinent technical literature. According to the most recent developments such equipment either comprises vertically arranged extraction columns with or without agitating components or horizontally designed frame belt extractors, screw-type extractors, pot or cup-type extractors, plants including endless conveyor belts, bucket-conveyor type extractors, basket type extractors etc.

Practically all technically feasible processes operate by the countercurrent method. In accordance with this method fresh extractant is used for the final rinsing of the material having already been extracted to a high degree. This final phase of extraction is frequently preceded by several steeping, washing and extracting steps until, finally, there is obtained a miscella containing about 15 to 35% oil and 65 to 85% solvent, depending on the type of extractor used.

Subsequent to the extraction, the miscella, possibly after a blank filtering and clarification, is separated by distillation into oil and solvent. The distillation is at low temperatures with chiefly indirect steam heating and is easily accomplished in two or three stages due to the considerably different boiling points of the constituents of the mixture.

As is generally known, it is of decisive importance for the quality of a vegetable oil, such as soy oil, that the content of phosphatides (lecithin) is as low as possible.

Such phosphatides as well as the fatty constituents of the oil exhibit considerable instability against autoxidation phenomena. This is, for example, the cause of oil becoming rancid. It has long been known that edible oils will keep only for a limited time. Due to this autoxidation phenomena, with formation of unsaturated aldehydes etc., a seedlike off-flavor develops, frequently after a few weeks only.

It has now been found as a result of detailed investigation that, independent of the type of extractant or of the operating conditions during extraction, such autoxidation reactions, involving also the phosphatides, start immediately whenever the extractant comes into contact with the comminuted seed material in the presence of atmospheric oxygen or whenever free, oxidizable surfaces are formed during the comminution of the seed material.

The autoxidation of the phosphatides is due to the coaction of oxygen and certain prooxygenic substances present in the seed material, particularly enzymes.

It has already been proposed to eliminate the influence of such enzymes by subjecting the seed material to heat treatment prior to extraction. Such heat treatment does have the effect of substantially destroying the enzymes (catalases) and reducing autoxidation. However, to achieve this, considerable expenditure in the way of process technology, apparatus and energy is required, out of all proportion to the possible success that may be obtained.

The specific enzymes causing the decomposition or autoxidation of the phosphatides (lecithin) can be inactivated also by sulfur compounds. Such sulfur compounds are present in considerable measure in the raw seed material. However, these sulfur compounds become inactive when, under the action of considerable heat, particularly in an air stream, also in the presence of highly volatile solvents (hexane), reaction products of the process, in the form of $H_2S$, COS, mercaptanes etc., are carried away too quickly.

Summarizing, technology so far has not been in a position to stop the autoxidation of the phosphatides (lecithin) because, on the one hand, the destruction of the enzymes is not justifiable economically and, on the other hand, the coaction of enzyme and oxygen responsible for autoxidation has not been eliminated. Moreover, the working with toxic, highly flammable, low-boiling extractants, such as benzene, hexane etc. presents considerable technical problems.

Therefore, it is necessary that, under operating conditions, the mixing of the extraction feedstock with the extractant (solvent) takes place in an entirely closed system excluding any influence of atmospheric oxygen as well as the occurrence of leakages.

Especially in the extraction of vegetable raw materials, but also in other extraction processes of industrial chemistry, the extraction proper in horizontal or vertical extractors generally is preceded by comminution of the raw material, whereby the material is brought into a finely divided form (flakes) facilitating extraction.

During the comminution (flaking) of oil seeds, for example, fresh, i.e. oxidizable surfaces are exposed, whereby considerable deterioration in quality is caused even before the extraction proper.

Therefore, provision must be made to exclude the influence of oxygen (air) already directly following the flaking. That means it is necessary to ensure that the entire apparatus between the flaking device and the extractor, but especially the unit or installation for the mixing of comminuted material and extractant, forms a completely closed system permitting no access of air and no escape of solvent vapors into the atmosphere.

Further, it is well known to those skilled in the art that when flaked, i.e. comminuted raw material, meets with the extractant, overheating (spontaneous beginning of reaction or extraction) or agglomeration, agglutination etc. are apt to occur, depending on the characteristics of the material involved. These undesirable attendant phenomena, which cause considerable disturbance in the process, make it necessary to provide for an optimally adjusted mixing process of comminuted extraction feedstock and solvent.

For such mixing, generally, agitating vessels, feed screws and similar mixing apparatus are used and it is necessary to ensure proper proportioning and dosage.

It has been found that it is extremely difficult to achieve proper dosage with large quantities and in this case the above-mentioned derivative problems can hardly be mastered. In case of the intermittent admixing of small quantities the above-mentioned problems do not occur to the same extent, but such intermittent admixing of small quantities has a restrictive effect on the economical use of the installation capacity and therefore is not justifiable.

SUMMARY OF THE INVENTION

It is an object of the invention to provide a device or apparatus for trouble-free, continuous charging of extractors wherein the mixing of extraction feedstock and solvent proceeds without disturbance even with large flow rates. That means that undesirable agglomeration and overheating in the mixing phase will not occur, any influence of atmospheric oxygen will be absolutely excluded, any escape of solvent vapors will be prevented and continuous, uniform charging of the extractor will be achieved.

Thus, the subject matter of the invention is an apparatus for trouble-free, continuous charging of extractors with extraction feedstock and extractant, said apparatus including a feed screw as a mixing system for the reactants, characterized in that the device connected between the feedstock preparation or comminution stage and the extractor consists of a closed system comprising vertical charging and equalizing vessel and a screw inclined with respect to the horizontal, said screw being in the form of a double screw wherein the spacing of the turns of the screw in the zone of the feeding and equalizing vessel increases continuously in the direction towards the discharge outlet, said feeding and equalizing vessel having a tubular connection piece for the feeding in of extractant or of solution returned from the extractor, a pressure-equalizing connection piece, an overflow connection piece, adjustable in height, for returning excess extractant or solution to the extractor, and an air outlet pipe provided at the upper end and adjacent to a cover, said feeding and equalizing vessel being mounted on the screw in the lowermost region thereof in a manner providing an airtight seal therebetween, the inclination of the screw being such that the space defined by the screw base and an imaginary line is constantly filled with extraction material and solvent.

BRIEF DESCRIPTION OF THE DRAWINGS

The novel apparatus and the operation thereof will be more readily apparent by reference to the accompanying FIGS. 1, 2 and 3, wherein.

DETAILED DESCRIPTION

The continuous mixing of extraction feedstock and extracting agent is already known as a process and described e.g. in U.S. Pat. No. 2,582,675 or British Pat. No. 1,147,709. However, these systems are generally bound to vertical extractors. Moreover, it is not possible with these known systems to achieve the good, lump-free and safe homogenization obtainable by the narrow spacing of the turns of the feed screw in the region of the inlet of said screw as provided by the present invention, and changing only gradually, with the increasingly wider spacing of the turns of the screw, i.e. in the direction towards the screw outlet and, thus, the extractor inlet, into a uniform suspension of comminuted, partially broken up reaction mass, solvent and already formed miscella.

Contrary to said known systems, the operation of the apparatus according to the present invention is such as to supply the extractor with an absolutely homogeneous mixture which is not only free from oxidized components but also consists of raw material uniformly saturated with solvent.

Generally, the novel apparatus for continuous charging of extractors can also be integrally connected with the extractor so as to form a unit with the latter; all that is required therefor is to join the discharge outlet of the screw directly to the inlet of the extractor.

Decisive for an optimal operating process with the novel charging apparatus for extractors is the presence of the double screw. The double screw provides a dispersing or even kneading effect during the mixing of raw material and miscella. Further, the variation of the screw threads is significant, with the spacing of the turns of the screw increasing continuously in the region of the feeding and equalizing vessel and attaining, at the end of said increase, a multiple of the spacing of the initial turns, as well as a system of tubular connection pieces on the charging and equalizing vessel mutually adjusted to one another.

Such a system has not so far been disclosed by the prior art. Rather, with the prior art systems, the mixing of the reactants is effected either in normal single-thread screws, as with British Pat. No. 1,147,709 and British Pat. No. 1,250,343, or in a system merely conveying the material or mixture, as with U.S. Pat. No. 2,582,675.

Only the combination according to the invention including feeding and equalizing vessel means with specific connection systems for solvent, solvent overflow and reflux, pressure equalization, air outlet etc. in particular positions on the vessel, with a specific screw structure and inclination of the latter with respect to the horizontal, has made it possible to build up a fully closed, continuously operating system ensuring absolutely trouble-free charging of the extractor with fresh material, solvent or miscella respectively in a manner relieving the extractor and preventing undesirable influencing of the material.

Figure 1:
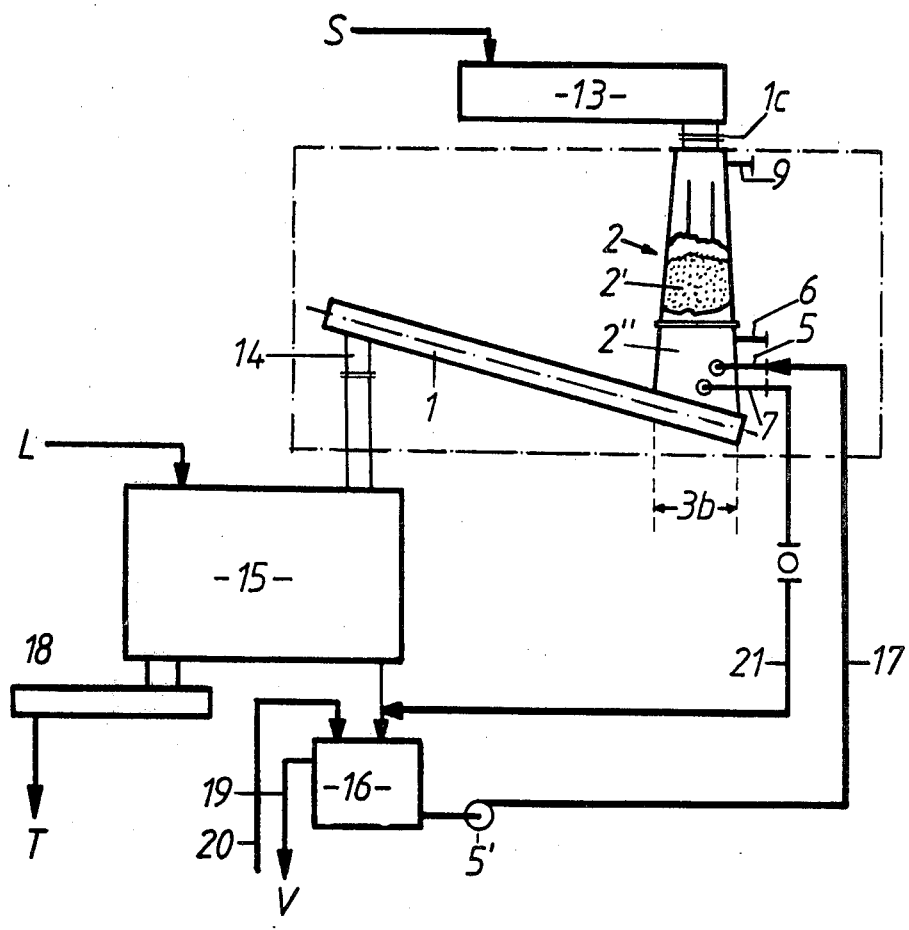
FIG. 1 is a block diagram showing the essential components of an extraction plant with a built-in charging device according to the invention and FIGS. 2 and 3 are schematic representations of the charging device itself.

According to FIG. 1 the extraction plant, e.g. for soy material (assumed here by way of example only) comprises a stock tank (not shown) from which the material (S) passes to a continuously operating comminuter (flaker) (13). The flakes, which may be predried, are fed, through suitable dosing means, such as a measuring orifice or diaphragm (1c), into the flake compartment (2') of the feeding and equalizing vessel (2) and are wetted with miscella in the miscella compartment (2") at the inlet (5) for returned miscella. The air contained in the raw material escapes through the air outlet connection (9). In the lower portion (3b) of the double screw (1, 1') (FIG. 2), the mixture is immediately seized by the relatively closely spaced screw turns (3a) and thoroughly intermixed. The mixing process becomes quieter with the gradual rise in the screw and in the course of this process a homogenous suspension is formed which leaves the screw at (14) and is discharged into the extractor (15). The operation of the extractor is well known. The miscella is collected in the tank (16) and returned by means of a pump (5') to the inlet (5) into the feeding and equalizing vessel (2) or the miscella compartment (2"). It is understood that additional or supplementary means are incorporated into the pipe system (17), such as filters, centrifuges, heat exchangers, means for withdrawing miscella and possibly means for adding solvent etc.

The residue from extraction is passed on by a screw conveyor (18), e.g. to a toaster (T) and from there for reprocessing. The complete miscella (V) is discharged from the tank (16) via the overflow (19). Provision is of course made for a circulation system (20).

The apparatus according to the invention for trouble-free continuous charging of the extractor is outlined in FIG. 1 by dot-dash lines.

Figures 2, 3:
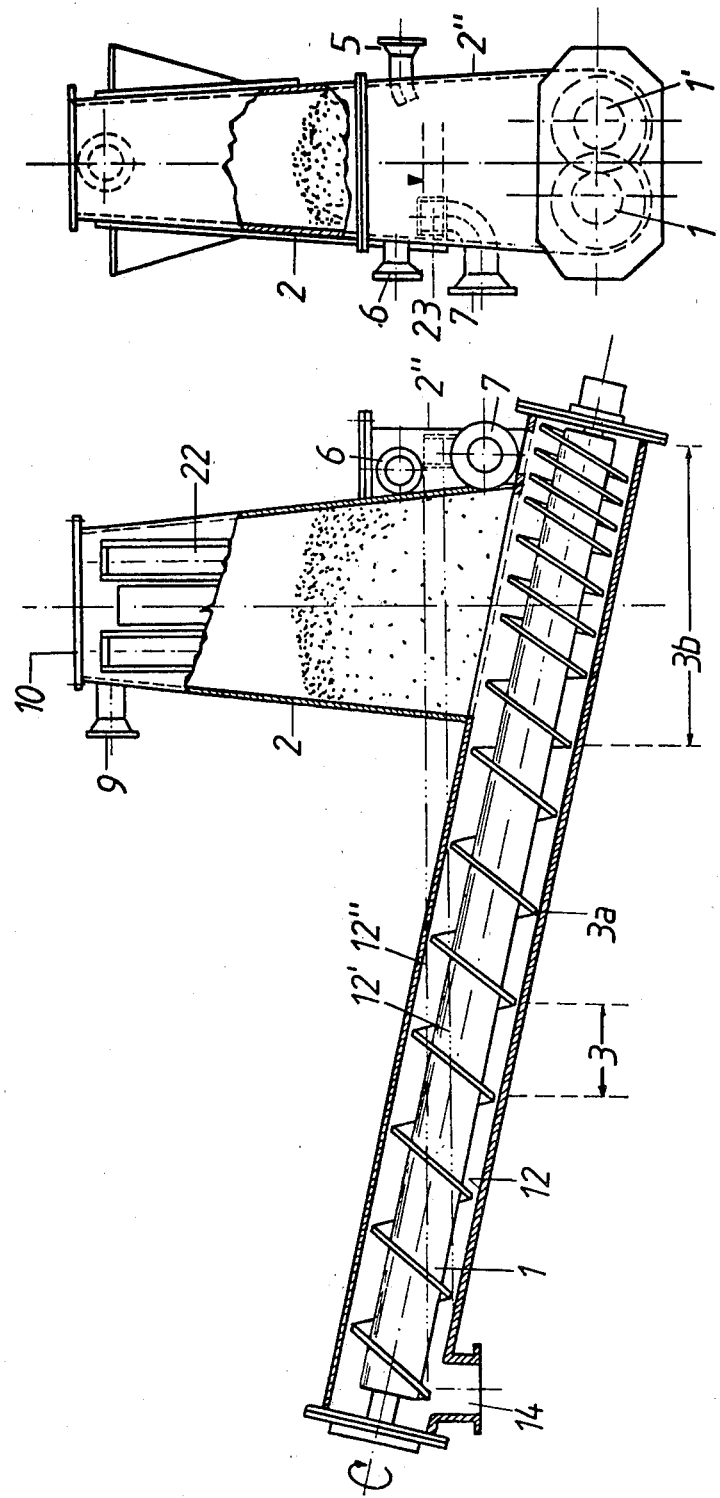

FIGS. 2 and 3 show more specifically the structure of the new charging apparatus for extractors according to the present invention. The apparatus substantially comprises the double screws (1, 1') the threads (3a) of which, in the region (3b), have increasing distances between the turns in the direction of the rise of the screw, as shown.

The angle of inclination of the axis of the screw relative to the horizontal generally is 10–45 degrees and particularly 30 degrees, although this angle is not of decisive importance for the entire system. The screw is of course spring mounted or flexibly suspended. Such details need not be shown here.

The feeding and equalizing vessel (2) is mounted on the zone of increasing pitch (3b) of the screw and connected to the latter with a perfect seal between the screw and the vessel. The vessel (2) generally is of rectangular cross-section and may be formed with a taper in the direction towards the top or cover (10). This cover has a suitable opening serving as an inlet for the pretreated feedstock (S) coming e.g. from the flaker (13) (FIG. 1). At a point slightly below said cover (10), the vessel (2) is provided with a connection piece (9) for connection e.g. with a suction system by means of which air introduced with the solids may be removed by suction. Further, the vessel (2) is equipped in well-known manner with sight glasses (22) etc. permitting to observe the level of the flake material loosely heaped up in the flake compartment (2'). In the lower zone (2") (miscella compartment), two connection pieces (5, 7) are provided, the positions of these connections being of special importance for the operation of the novel apparatus. Connection piece (5) is connected to a pipe duct (17) (see FIG. 1) by which returned extraction solution (miscella) or also additional solvent (L) is brought into the miscella compartment (2"). Connection piece (7) connects the mixing zone or the miscella compartment (2") with a return duct (21) leading to a tank (16) (FIG. 1); in the interior of the mixing zone said connection piece (7) opens into an adjustable or controllable overflow (23) the position of which at any one time determines the level (12', 12") and ensures that the space between the screw base (12) and the line (12') is constantly filled with extraction mass (suspension).

The mixing screw (1) is in the form of a double screw (1, 1') with intermeshing screw threads (3a). The screw pitch (3) is of varying magnitude in zone (3b), i.e. the zone where the feeding and equalizing vessel is mounted on the screw. In this zone, the pitch increases in the direction towards the discharge end (14) of the screw either by groups, that means that the screw turns are arranged in groups each comprising a plurality of turns spaced at equal distances from one another, or asymptotically from one turn to the next.

The position of the miscella or solvent inlet (5) and the position of the variable overflow or reflux (7), the rate of rotation of screw (1), which is controlled electronically, and the slope angle of the screw are so adjusted that the level of the suspension within the system consisting of the screw (1) and the feeding and equalizing vessel (2) corresponds approximately to the line (12'), but does not rise beyond the line (12"). Furthermore, by the electronic control of the rate of rotation of the screw it is ensures that there is always a layer of extraction material above the level of miscella (12')/(12") within the vessel (2).

The novel apparatus makes possible the feeding of material into the extractor without any disturbance and without any influence of atmospheric oxygen on the flaked material and on the mixture with the solvent or the miscella. Any oxidation of oils during the extraction process is absolutely precluded.

Extractor charging devices that have become known heretofore still have the drawback that together with the extraction feedstock atmospheric oxygen is carried into the extraction space to a considerable extent. This makes it necessary that the whole system is connected through venting units with extensive benzene recovery installations. With known extraction plants, the air introduced together with the extraction feedstock may become saturated with extractant, particularly hexane, up to 3 kg/m$^3$ exhaust air, depending on the temperature, and such extractant has to be recovered from the exhaust air for economical reasons as well as for safety reasons.

However, solvent recovery installations require not only high capital investments but also extensive maintenance work and highly complicated apparatus. The hazards to the environment caused by such installations are well known. Mill accidents due to the development of explosive mixtures of solvent vapor and air are no rare occurrences.

The measures of the present invention make such solvent recovery installations unnecessary. Thus, altogether, a considerable improvement in safety of extraction plants with solvents is achieved.

Finally, it may be recalled that disturbances in operation may result in considerable excess pressure in the extractor. Such pressure values are sufficiently high to cause solvent gases to be brought back through the pipe system and known charging apparatus into the seed preparation system where they are not infrequently the cause of explosions and fires.

By the measures of the invention solvent losses are absolutely prevented and, likewise, the exclusion of oxygen prevents any corrosion of apparatus.

The electronically controlled rate of rotation of the double screw makes the capacity of the plant variable; the level of the flakes within the vessel (2) may move up to the pressure equalizing connection piece (9); the system of the double screw with varying pitch contributes to homogenization at an early stage and uniform and quieter continued motion and transfer into the extractor. Thereby the extractor is relieved considerably.

I claim:

1. Apparatus for continuous charging of extractors with extraction feedstock and extractant which comprises an extractor, a closed system upstream from the extractor and communicating therewith comprising a vertical feeding and equalizing vessel, means for feeding feedstock to said vessel, and means for feeding extractant to said vessel communicating with said extractor for recycling, and a feed screw as a mixing means for extraction feedstock and extractant communicating with said vessel at the lower region thereof having a discharge outlet to the extractor at the upper region thereof, wherein said screw is inclined with respect to the horizontal and wherein the spacing of the screw turns in the area of the feeding and equalizing vessel increases continuously in the direction towards the discharge outlet to the extractor, said feeding and equalizing vessel being mounted on the screw in a manner providing an airtight seal between the vessel and the screw and providing together with the inclination of the screw that the screw is constantly filled with extraction feedstock and extractant.

2. An apparatus according to claim 1 wherein said means for feeding feedstock includes a feedstock comminution stage.

3. An apparatus according to claim 1 wherein said screw is in the form of a double screw with intermeshing threads.

4. An apparatus according to claim 1 wherein the spacing of the screw turns in the area of the feeding and equalizing vessel increases continuously in the direction towards the discharge outlet to the extractor.

5. An apparatus according to claim 1 wherein said feeding and equalizing vessel has a tubular connection piece for the feeding in of extractant or solution returned from the extractor.

6. An apparatus according to claim 1 wherein said vessel includes a pressure-equalizing connection piece.

7. An apparatus according to claim 1 wherein said vessel includes an overflow connection piece which is adjustable in height for returning excess extractant or solution to the extractor.

8. An apparatus according to claim 1 wherein said vessel includes an air outlet connection piece at the upper end of the vessel.

9. An apparatus according to claim 1 wherein said vessel is mounted on the screw in the lowermost area thereof.

10. An apparatus according to claim 1 wherein the angle of inclination of the axis of the screw relative to the horizontal is °–45°.

* * * * *

UNITED STATES PATENT AND TRADEMARK OFFICE
CERTIFICATE OF CORRECTION

PATENT NO. : 4,390,506
DATED : June 28, 1983
INVENTOR(S) : Heinz O. Schumacher

It is certified that error appears in the above-identified patent and that said Letters Patent are hereby corrected as shown below:

Column 4, line 35, after "invention" insert ---,---.

Column 4, line 36, after "including" insert ---a---.

Column 5, line 17, after "double" change "screws" to ---screw---.

Column 8, line 21, claim 10, change " °-45°" to ---10°-45°---.

Signed and Sealed this

Twenty-second Day of November 1983

[SEAL]

Attest:

GERALD J. MOSSINGHOFF

Attesting Officer  Commissioner of Patents and Trademarks